(12) United States Patent
Ito et al.

(10) Patent No.: US 11,609,698 B1
(45) Date of Patent: Mar. 21, 2023

(54) DATA STORAGE SYSTEM AND STORAGE CONTROL METHOD INCLUDING STORING A LOG RELATED TO THE STORED DATA

(71) Applicant: Hitachi, Ltd., Tokyo (JP)

(72) Inventors: Shintaro Ito, Tokyo (JP); Yoshinori Ohira, Tokyo (JP); Hiroto Ebara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/939,112

(22) Filed: Sep. 7, 2022

(30) Foreign Application Priority Data

Mar. 31, 2022 (JP) .............................. JP2022-059010
Jun. 23, 2022 (JP) .............................. JP2022-101368

(51) Int. Cl.
*G06F 3/06* (2006.01)
*G06F 12/02* (2006.01)

(52) U.S. Cl.
CPC .......... *G06F 3/0616* (2013.01); *G06F 3/0659* (2013.01); *G06F 3/0679* (2013.01); *G06F 12/0253* (2013.01); *G06F 2212/7205* (2013.01)

(58) Field of Classification Search
None
See application file for complete search history.

(56) References Cited

U.S. PATENT DOCUMENTS 9,864,688 B1 * 1/2018 O'Brien .................... G06F 9/46
10,083,100 B1   9/2018 Agetsuma et al.
11,340,829 B1 * 5/2022 Shveidel ............. G06F 12/0871
11,409,454 B1 * 8/2022 Shveidel ............... G06F 3/0635
11,429,293 B1 * 8/2022 Vankamamidi ......... G06F 3/067
2014/0310499 A1 * 10/2014 Sundararaman .... G06F 12/0269
                                                          711/203
2020/0241793 A1 * 7/2020 Shveidel ............... G06F 3/0604
2021/0216569 A1 * 7/2021 David ................... G06F 3/0658
2021/0286726 A1 * 9/2021 Kucherov ........... G06F 12/0811
2022/0114100 A1 * 4/2022 David ................. G06F 12/0815
2022/0214812 A1 * 7/2022 Alkalay ............... G06F 3/0619
2022/0342825 A1 * 10/2022 Derzhavetz ........... G06F 12/123

FOREIGN PATENT DOCUMENTS

JP          2019-101703 A       6/2019

* cited by examiner

*Primary Examiner* — Kevin Verbrugge
(74) *Attorney, Agent, or Firm* — Mattingly & Malur, PC

(57) ABSTRACT

A storage system having high performance and high reliability includes a non-volatile storage device, a storage controller configured to control data to be read and written from and to the storage device using a storage function; and a volatile memory. In the reading and writing, the storage controller generates a log and stores the log in a log memory, writes the log stored in the memory to the storage device, and collects a capacity of the storage area of the memory storing the log written to the storage device. In collecting a free area of the memory, the storage controller executes a base image saving method of writing in the storage device in units of storage areas having a plurality of logs and collecting a free area, and a garbage collection method of writing in the storage device in units of logs and collecting a free area.

22 Claims, 25 Drawing Sheets

SYSTEM CONFIGURATION DIAGRAM

HARD CONFIGURATION DIAGRAM OF NODE

SOFTWARE MODULE DIAGRAM

MEMORY CONFIGURATION DIAGRAM

FIG. 8

CACHE DIRECTORY

| CACHE ADDRESS | LOGICAL VOLUME NUMBER | LOGICAL VOLUME ADDRESS | ATTRIBUTE |
|---|---|---|---|
| 0 | 1 | 1024 | Dirty |
| 1 | - | - | - |
| 2 | 32 | 50876 | Dirty |
| 3 | 1 | 4 | Clean |
| ... | ... | ... | |

FIG. 9

LOG HEADER

| FIELD | VALUE |
|---|---|
| LOG SEQUENCE NUMBER | 30 |
| UPDATE ADDRESS | 0x00001000 |
| UPDATE SIZE | 32 |
| AREA TYPE | CONTROL INFORMATION |
| VALIDITY FLAG | VALID |

CACHE DATA UPDATE PROCESS

LOG CREATION PROCESS

LOG SAVING PROCESS

BASE IMAGE SAVING PROCESS

LOG RECOVERY PROCESS

LOG SAVING PROCESS

BASE IMAGE SAVING PROCESS

LOG RECOVERY PROCESS

DATA STORAGE SYSTEM AND STORAGE CONTROL METHOD INCLUDING STORING A LOG RELATED TO THE STORED DATA

CROSS-REFERENCE TO RELATED APPLICATION

The present application claims priority from Japanese applications JP2022-059010, filed on Mar. 31, 2022, and JP2022-101368 filed Jun. 23, 2022, the contents of which are hereby incorporated by reference into this application.

BACKGROUND OF THE INVENTION

1. Field of the Invention

The present invention relates to a storage system and a storage control method.

2. Description of the Related Art

In the related art, in a storage system, a redundancy configuration is adopted in order to improve availability and reliability.

For example, JP-A-2019-101703 (Patent Literature 1) proposes a storage system as described below.

In a storage system including a plurality of storage nodes, the storage node includes one or more storage devices that respectively provide a storage area; and one or a plurality of storage controllers which read and write requested data from and to a corresponding storage device according to a request from a higher-level device. Each of the storage controllers retains predetermined configuration information required for reading and writing the requested data from and to the corresponding storage device according to the request from the higher-level device. A plurality of control software is managed as a redundancy group, and the configuration information retained in each of the control software belonging to the same redundancy group is synchronously updated. The plurality of control software configuring the redundancy group is deployed in different storage nodes respectively so as to distribute a load of each of the storage nodes.

According to Patent Literature 1, it is possible to construct a storage system capable of continuing reading and writing even at the time of a node failure by using a technique (software defined storage: SDS) in which a storage system is constructed by software. In order to improve performance and reliability in such a storage system, it is required to efficiently execute non-volatilization on various types of data. The invention proposes a method of efficiently storing control information, cache data, and the like of a storage system in a storage device.

SUMMARY OF THE INVENTION

In order to achieve the above object, one typical storage system of the invention is a storage device including: a non-volatile storage device; a storage controller configured to process data to be read and written from and to the storage device using a storage function; and a volatile memory, in which the storage controller is configured to, when receiving a data write request, store data related to the received write request in the memory, store a log related to the data stored in the memory in the storage device, execute a completion response to a source of the data write request after the log is stored in the storage device, and process the data stored in the memory using the storage function and destage the data in the storage device.

In addition, one typical storage control method of the invention is a storage control method in a storage system including a non-volatile storage device, a storage controller configured to process data to be read and written from and to the storage device using a storage function, and a volatile memory, in which the storage controller is configured to, when receiving a data write request, store data related to the received write request in the memory, store a log related to the data stored in the memory in the storage device, execute a completion response to a source of the data write request after the log is stored in the storage device, and process the data stored in the memory using the storage function and destage the data in the storage device.

According to the invention, it is possible to achieve a storage system having both high performance and high reliability.

BRIEF DESCRIPTION OF THE DRAWINGS

FIG. 8 is a diagram illustrating an example of a cache directory.
FIG. 9 is a diagram illustrating a configuration of a log header.

DESCRIPTION OF THE PREFERRED EMBODIMENTS

Hereinafter, embodiments of the invention will be described with reference to the drawings. The embodiments relate to, for example, a storage system including a plurality of storage nodes on which one or more SDSs are installed.

In the embodiments to be disclosed, each storage node stores control information and cache data in a memory. The storage node includes a non-volatile device. When the control information and data are updated in response to a write request from a host, updated data is stored in this non-volatile device in a log format. As a result, it is possible to set the updated data non-volatile. Thereafter, the storage node responds to the host. Then, data in the memory is destaged in a storage device asynchronously with the response. In the destage, a process of reflecting written data in the storage system and writing the data in the storage device is executed. In the destage, various storage functions such as thin provisioning, snapshot, and data redundancy are provided, and a process of creating a logical-physical conversion address is present such that data can be searched or accessed randomly. On the other hand, a purpose of the non-volatile device storage in the log format is to restore data in the memory in case the data is lost, and therefore the process for storage is light and fast. Therefore, when a volatile memory is used, a response performance can be improved by quickly storing the data in a non-volatile storage device in the log format and executing a completion response to a host device.

When being stored in the log format, the control information and the data are stored in an additional writing format. In order to store data in the additional writing manner, it is necessary to collect a free area. In order to collect a free area, two types of methods including a base image saving method and a garbage collection method are separately used. The base image saving method is a method in which a whole of a constant target area of control information and cache data is written in a non-volatile device, and all update logs therebetween are discarded (collected as free areas). The garbage collection method is a method in which an unnecessary log that is not the latest update log among update logs is identified, and a log other than the unnecessary log is written in another area to collect a log area. At the time of power interruption, the control information and the cache data are not lost by restoring the control information and the cache data to the memory by using the base image saving method and the logs. By separately using the two methods to collect a free area, management information for free management can be reduced, overhead for collecting the free area can be reduced, and a performance of a storage can be improved.

Figure 1:
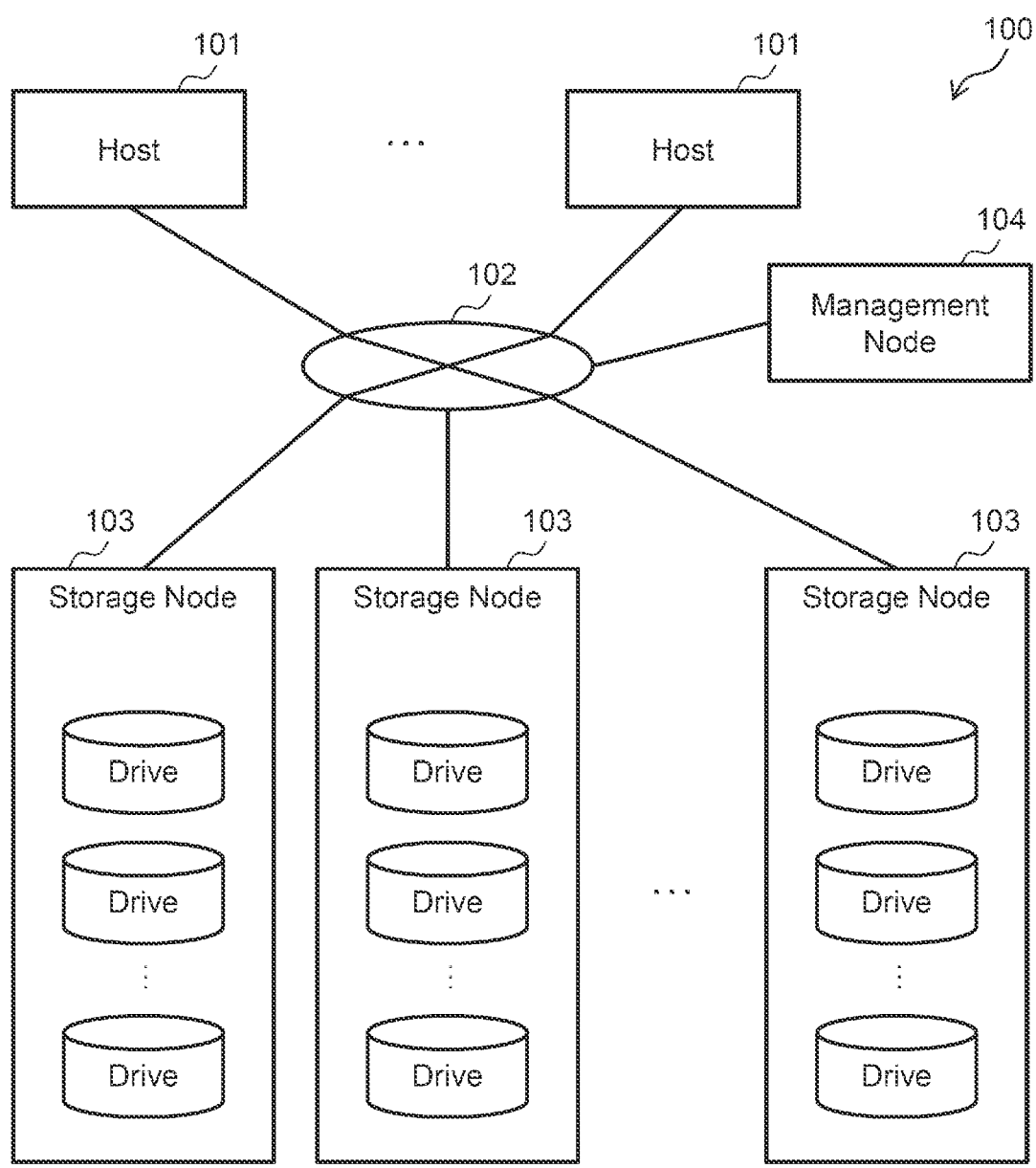
FIG. 1 is a configuration diagram of a storage system according to a first embodiment.

First Embodiment (1) First Embodiment
(1-1) Configuration of Storage System According to First Embodiment FIG. 1 illustrates a storage system according to a first embodiment as a whole.

A storage system 100 includes, for example, a plurality of host devices 101 (Host), a plurality of storage nodes 103 (Storage Node), and a management node 104 (Management Node). The host devices 101, the storage nodes 103, and the management node 104 are connected to one another via a network 102 constituted by fibre channel, Ethernet (registered trademark), local area network (LAN), and the like.

The host device 101 is a general-purpose computer device that transmits a read request or a write request (hereinafter, collectively referred to as an input/output (I/O) request as appropriate) to the storage node 103 in response to a request from a user operation, an installed application program, or the like. The host device 101 may be a virtual computer device such as a virtual machine.

The storage node 103 is a computer device that provides, for the host device 101, a storage area from which and to which data is read and written. The storage node 103 is, for example, a general-purpose server device.

The management node 104 is a computer device used by a system administrator to manage the entire storage system 100. The management node 104 manages the plurality of storage nodes 103 as a group called a cluster. FIG. 1 illustrates an example in which only one cluster is provided, while a plurality of clusters may be provided in the storage system 100.

Figure 2:
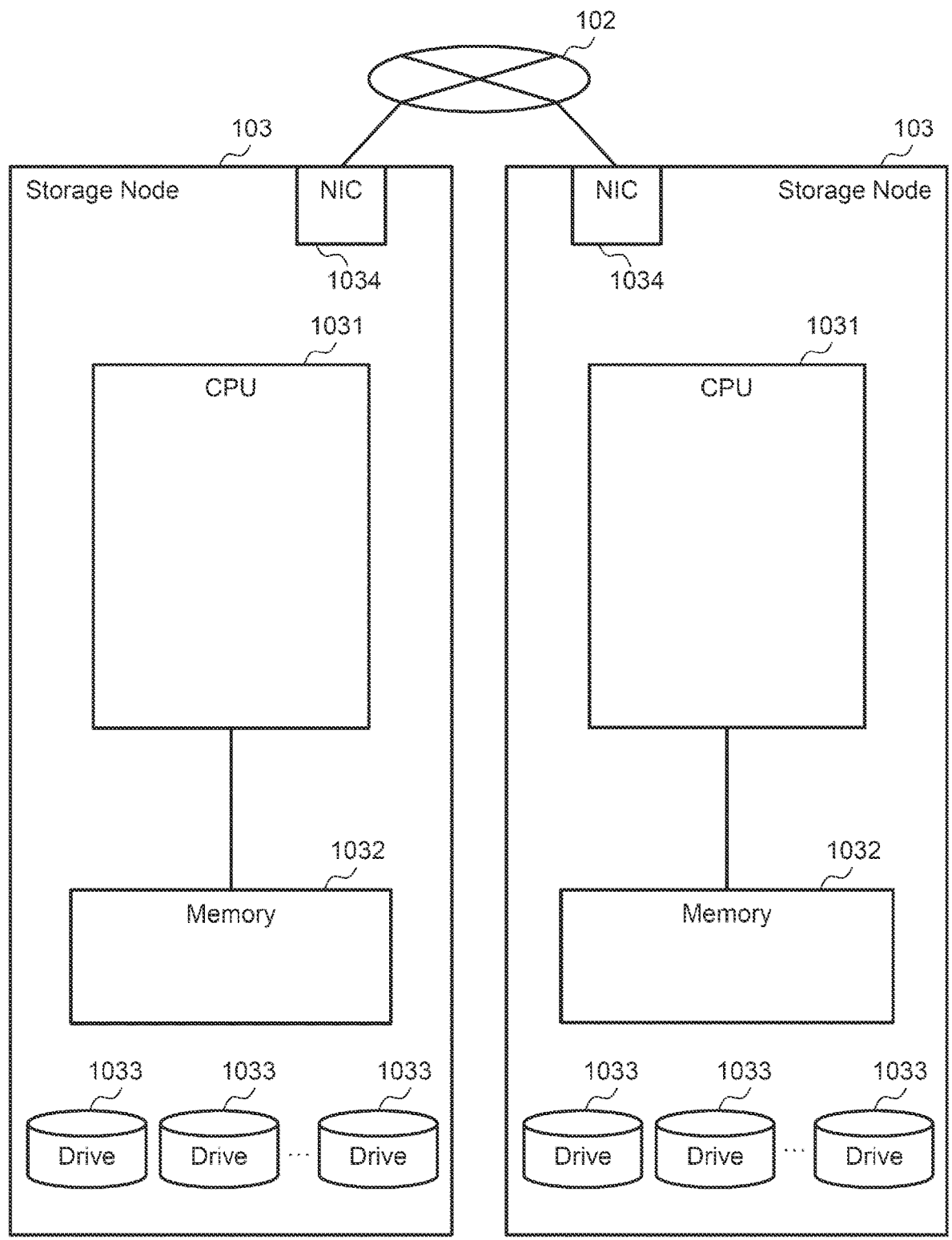
FIG. 2 is a diagram illustrating an example of a physical configuration of a storage node.

FIG. 2 is a diagram illustrating an example of a physical configuration of the storage node 103.

The storage node 103 includes a central processing unit (CPU) 1031, a memory 1032, a plurality of storage devices 1033 (Drive), and a communication device 1034 (network interface card, NIC).

The CPU 1031 is a processor that controls an operation of the entire storage node. The memory 1032 is implemented by a semiconductor memory such as a SRAM (Static RAM (random access memory)) and a Dynamic RAM (DRAM). The memory 1032 is used to temporarily retain various programs and necessary data. When the CPU 1031 executes a program stored in the volatile memory 1032, various processes as a whole of the storage node 103, which will be described later, are executed.

The storage device 1033 includes one or a plurality of types of large-capacity non-volatile storage devices such as a solid state drive (SSD), a SAS (Serial Attached SCSI (small computer system interface)) hard disk driver, and a SATA (Serial ATA (advanced technology attachment)). The storage device 1033 provides a physical storage area from which and to which data is read and written in response to the I/O request from the host device 101.

The communication device 1034 is an interface for the storage node 103 to communicate with the host device 101, another storage node 103, or the management node 104 via the network 102. The communication device 1034 is implemented by, for example, NIC and FC cards. The communication device 1034 executes protocol control during the communication with the host device 101, another storage node 103, or the management node 104.

Figure 3:
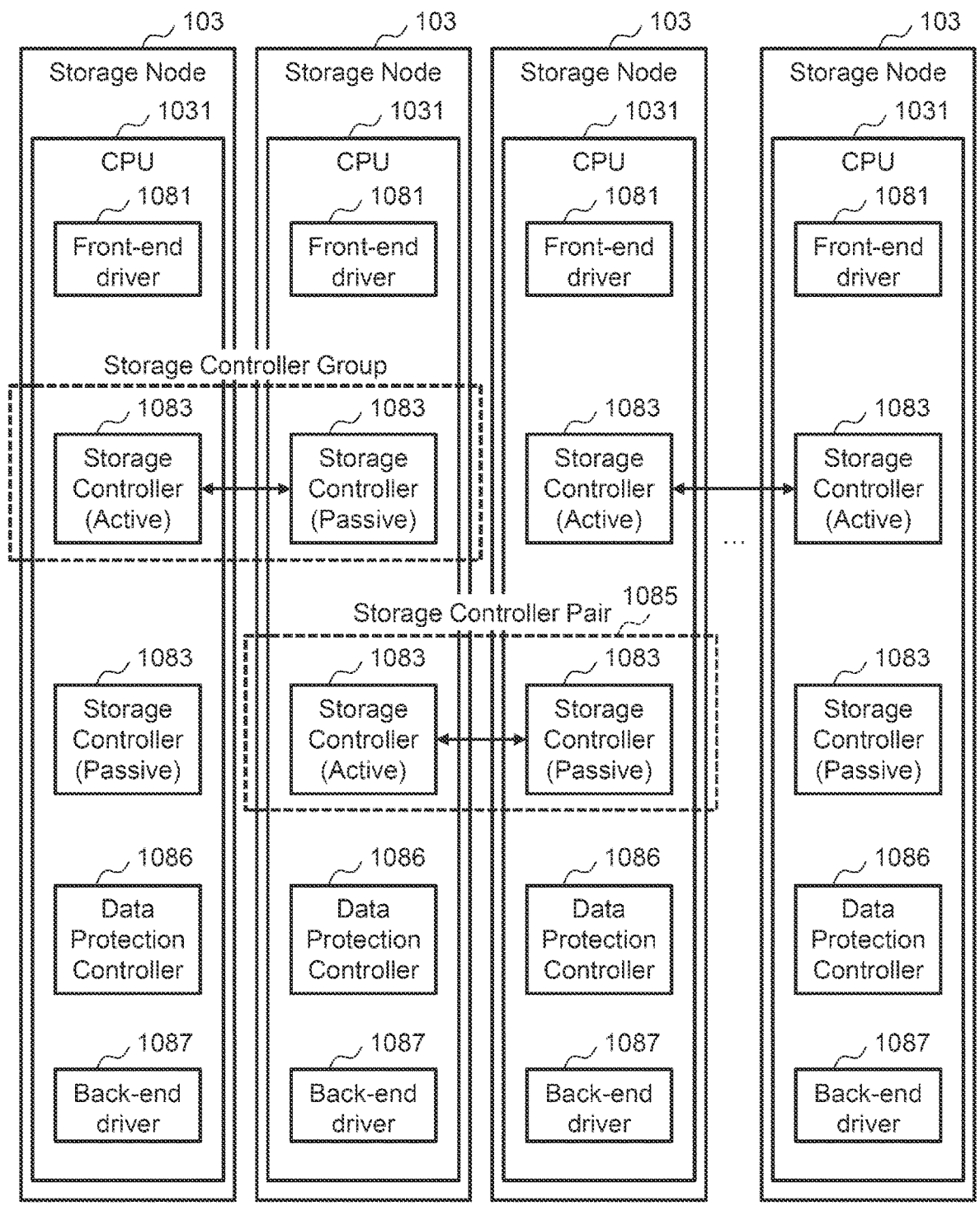
FIG. 3 is a diagram illustrating an example of a logical configuration of a storage node.

FIG. 3 is a diagram illustrating an example of a logical configuration of the storage node 103.

The storage node 103 includes a front-end driver 1081 (Front-end driver), a back-end driver 1087 (Back-end driver) one or a plurality of storage controllers 1083 (Storage Controller), and a data protection controller 1086 (Data Protection Controller).

The front-end driver 1081 is software that has a function of controlling the communication device 1034 and providing the storage controller 1083 with an abstracted interface at the time of communication with the host device 101, another storage node 103, or the management node 104, to the CPU 1031.

The back-end driver 1087 is software that has a function of controlling each storage device 1033 in a self-storage node 103 and providing an abstracted interface to the CPU 1031 at the time of communication with each storage device 1033.

The storage controller 1083 is software that functions as a controller for an SDS. The storage controller 1083 receives the I/O request from the host device 101 and issues an I/O command according to the I/O request to the data protection controller 1086. In addition, the storage controller 1083 has a logical volume configuration function. The logical volume configuration function associates a logical chunk constituted by the data protection controller with a logical volume to be provided to the host. For example, a straight mapping method (a logical chunk and a logical volume are associated at a ratio of 1:1 and an address of the logical chunk and an address of the logical volume are the same) and a virtual volume function (Thin Provisioning) method (a method in which the a logical volume and a logical chunk are divided into small size areas (pages) and addresses of the logical volume and the logical chunk are associated with each other in units of pages) may be adopted.

In the case of the first embodiment, each storage controller 1083 installed in the storage node 103 is managed, together with another storage controller 1083 disposed in another storage node 103, as a pair constituting a redundancy configuration. In the following, the pair is referred to as a storage controller group 1085.

It should be noted that FIG. 3 illustrates a case in which one storage controller group 1085 is implemented by two storage controllers 1083. In the following, the description will be made assuming that the storage controller group 1085 is implemented by two storage controllers 1083, but one redundancy configuration may be implemented by three or more storage controllers 1083.

In the storage controller group 1085, one storage controller 1083 is set to a state (a state of an active system, hereinafter referred to as an active mode) in which the one storage controller 1083 can receive the I/O request from the host device 101. In addition, in the storage controller group 1085, the other storage controller 1083 is set to a state (a standby system state, hereinafter referred to as a standby mode) in which the other storage controller 1083 cannot receive the I/O request from the host device 101.

In the storage controller group 1085, when a failure occurs in the storage controller 1083 set to the active mode (hereinafter, referred to as an active storage controller) or the storage node 103 in which the active storage control unit is disposed, the state of the storage controller 1083 set to the standby mode until then (hereinafter, referred to as a standby storage controller) is switched to the active mode. Accordingly, when the active storage controller cannot operate, an I/O process executed by the active storage controller can be taken over by the standby storage controller.

The data protection controller 1086 is software that has a function of allocating a physical storage area provided by the storage device 1033 in the self-storage node 103 or the other storage node 103 to each storage controller group 1085, and reading or writing designated data from or to the corresponding storage device 1033 in response to the I/O command provided by the storage controller 1083.

In this case, when the physical storage area provided by the storage device 1033 in the other storage node 103 is allocated to the storage controller group 1085, the data protection controller 1086 cooperates with the data protection controller 1086 installed in the other storage node 103 to exchange data with the other data protection controller 1086 via the network 102, and read or write the data from or to the storage area in response to an I/O command provided by the active storage controller of the storage controller group 1085.

Figure 4:
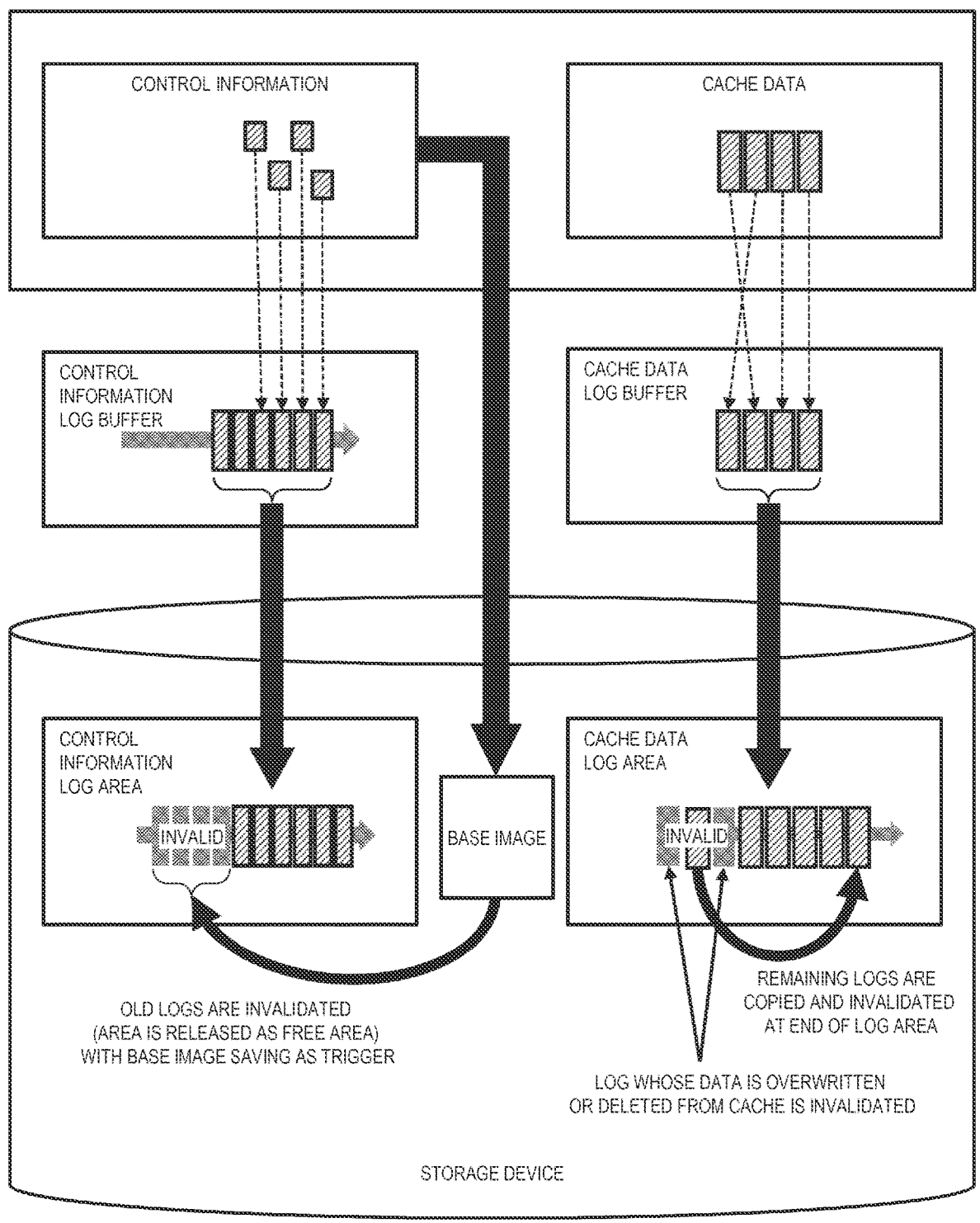
FIG. 4 is a diagram illustrating an outline of a disclosed storage system and a disclosed storage control method.

FIG. 4 is a diagram illustrating an outline of the disclosed storage system and a disclosed storage control method.

The storage controller updates control information and cache data for the I/O process from the host and other various processes. At this time, control information or cache data on the memory is updated, and a log thereof is stored in the storage device and set non-volatile. Therefore, an update log is created in a control information log buffer or a cache log buffer. The log includes the updated data per se and a log header, and is information indicating how the control information and the cache data on the memory are updated. As illustrated in FIG. 9, the log header includes information indicating an update position, an update size, and an order relation between updates.

The update log on the log buffer is written in a log area on the storage device in an additional writing format. The writing may be executed immediately or asynchronously.

Since the additional writing is executed, a free area of the log area on each device gradually decreases, and writing cannot be executed. In order to prevent this, it is necessary to collect the free area. Different methods are used on a log area for the control information and a log area for the cache data.

A base image saving method is used for the control information. In the base image saving method, the entire control information is copied to a base image area on the storage device. When the copy is completed, all update logs before start of the copy are invalidated (collected as free areas).

Meanwhile, a garbage collection method is used in collecting a free area of the log area for the cache data. When the cache data is overwritten or deleted from cache (by asynchronous destage process described later), a cache data log is invalid. In the garbage collection method, the log area is collected as a free area by copying valid old logs as new logs at an end of a log area, except for invalid logs.

Figure 5:
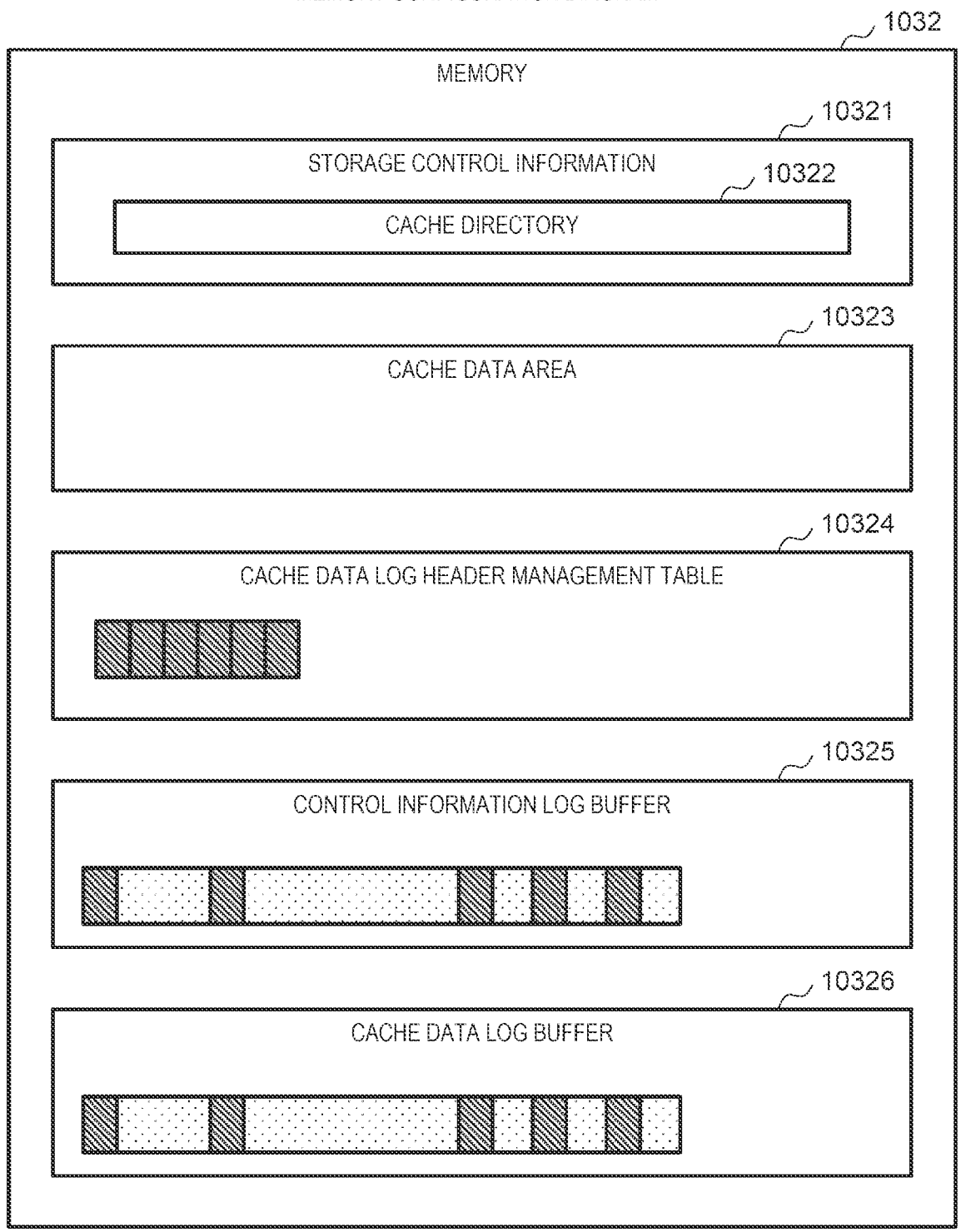
FIG. 5 is a diagram illustrating an example of a configuration diagram of a memory.

FIG. 5 is an example of a configuration diagram of the memory. The memory stores storage control information 10321, a cache data area 10323, a cache data log header management table 10324, a control information log buffer 10325, and a cache data log buffer 10326.

The storage control information 10321 is an area in which control information for achieving various storage functions is stored, and includes, for example, a cache directory 10322. A cache directory will be described in FIG. 8.

The cache data log header management table 10324 is a table that stores log headers of all cache data logs on a disk.

The control information log buffer 10325 temporarily retains a control information log. The cache data log buffer 10326 temporarily retains a cache data log.

Figure 6:
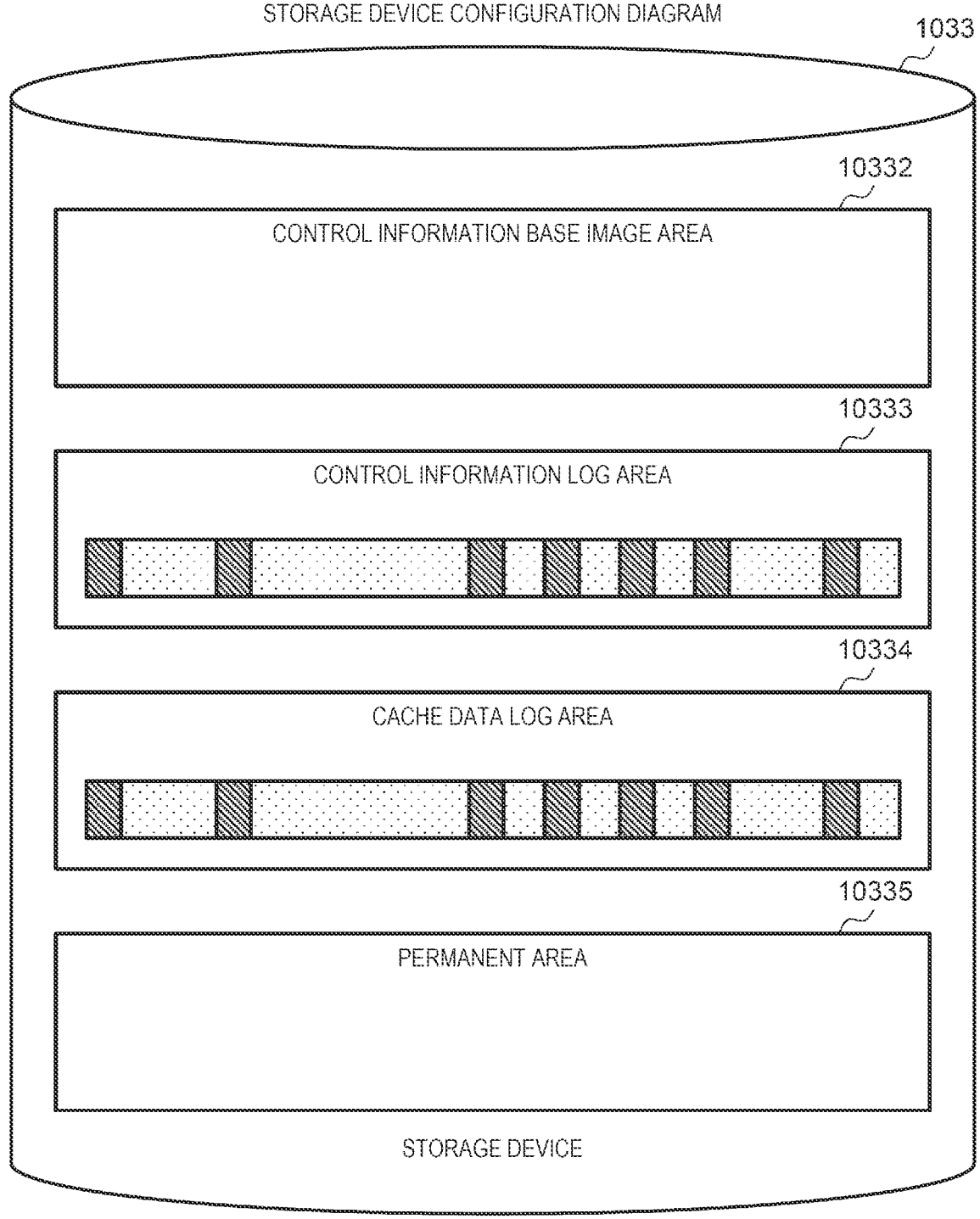
FIG. 6 is a diagram illustrating an example of a configuration diagram of a storage device.

FIG. 6 is an example of a configuration diagram of the storage device. The storage device includes a control information base image area 10332, a control information log area 10333, a cache data log area 10334, and a permanent area 10335.

The control information base image area 10332 is an area in which the entire control information is copied in a base image saving process, which will be described later. Each of the control information log area 10333 and the cache data log area 10334 is a destination area in which logs are saved in a log saving process, which will be described later. The permanent area 10335 is an area for storing user data, which is managed by the data protection controller 1086.

Each of the areas will be described in each process flow described later.

Figure 7:
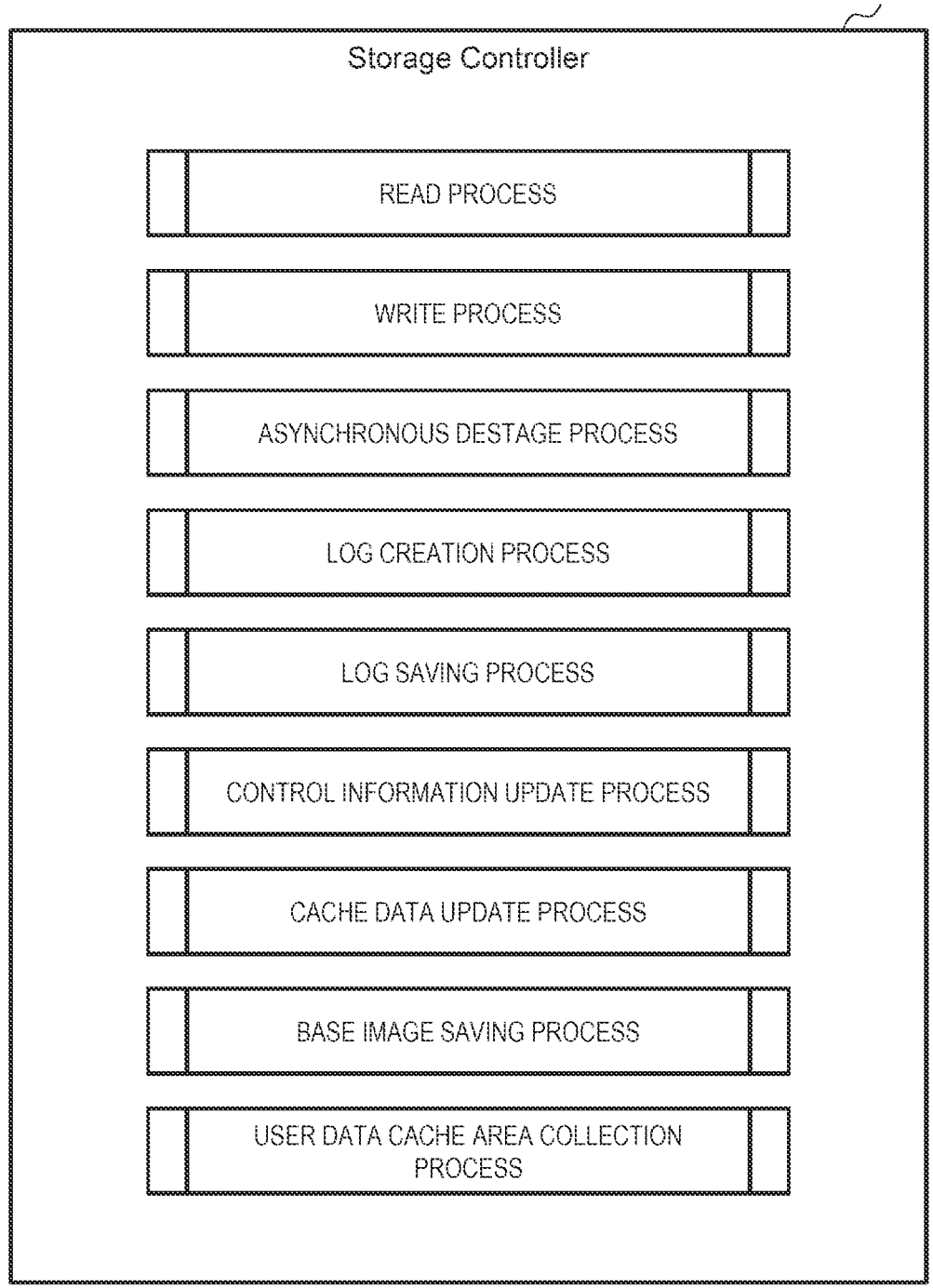
FIG. 7 is a diagram illustrating an example of a software module configuration of a storage controller.

FIG. 7 is a diagram illustrating an example of a software module configuration of the storage controller 1083.

The storage controller 1083 executes a log creation process, the log saving process, a control information update process, a cache data update process, the base image saving process, a user data cache area collection process, a read process, a write process, and an asynchronous destage process. Details of each process will be described later.

Hereinafter, the control information will be described.

FIG. 8 is a diagram illustrating an example of the cache directory. The cache directory is management information of areas (cache segments) obtained by subdividing a cache area, and has entries corresponding to the cache segments respectively.

Each entry includes a cache address, a logical volume number, a logical volume address, and an attribute entry. The cache address indicates an address on the memory of a cache segment corresponding to each entry. The logical volume number and the logical volume address indicate which logical volume and which address data stored in the cache segment belongs to. When no data is stored in the cache segment, "-" indicating "no value" is stored. When data is stored in the cache segment, an attribute field has a value of "Dirty" or "Clean". "Dirty" indicates that the data is not destaged and is not written in the storage device. "Clean" indicates that the data is destaged and matches a value written in the storage device.

FIG. 9 illustrates a configuration of a log header. A log header is a table included in each log stored in a log buffer area on the memory or the log area on the storage device.

Each log header includes fields of a log sequence number, an update address, an update size, an area type, and a validity flag.

The log sequence number field stores a log sequence number uniquely assigned to each log. The update address field stores an address of control information or cache data of each log, which is an update target. The update size field stores an update size. The area type field stores a value for identifying either the control information or the cache data. Here, it is assumed that a character string of "CONTROL INFORMATION" or "CACHE DATA" is stored. In the validity flag field, a value of "VALID" or "INVALID" is set.

Figure 10:
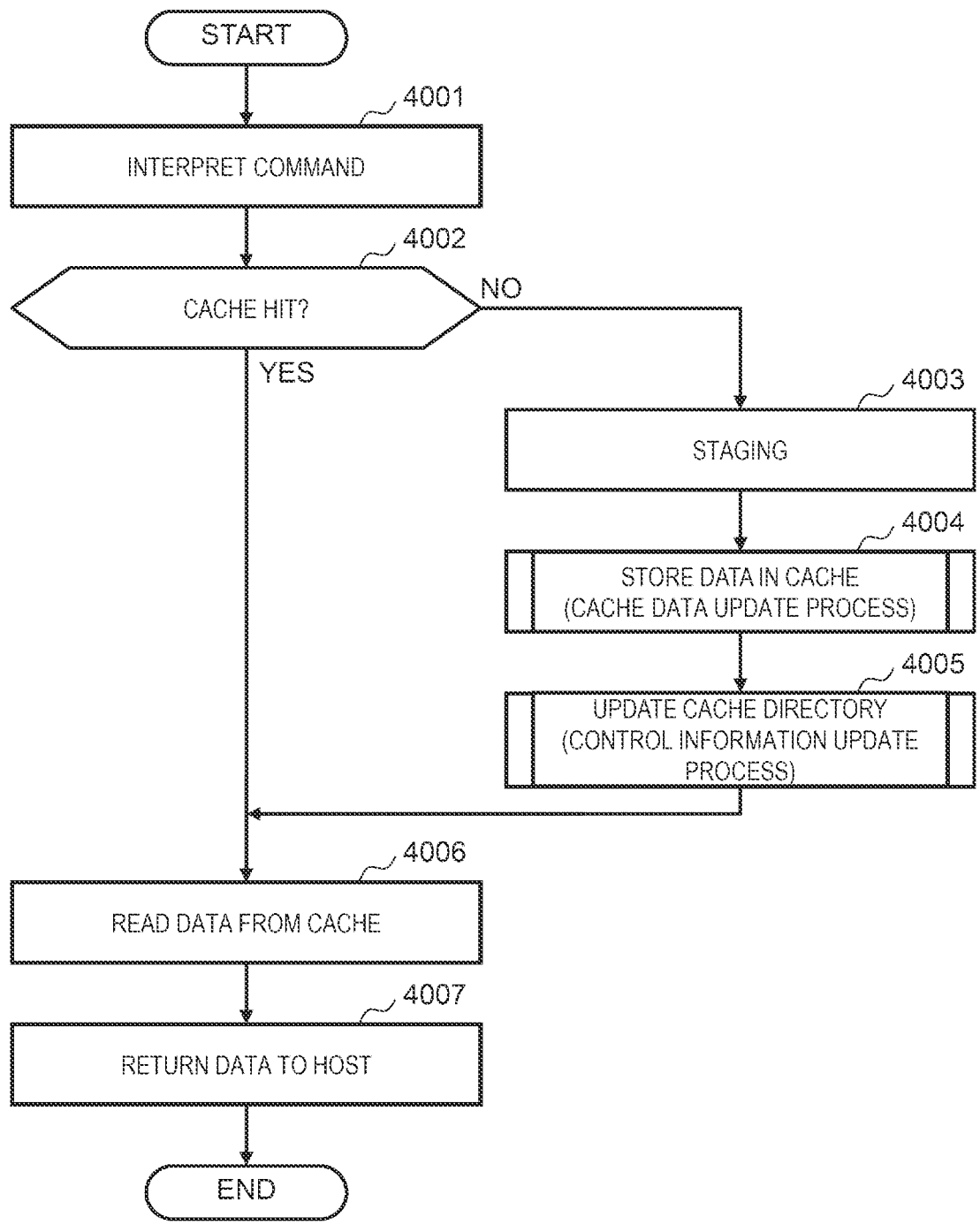
FIG. 10 is a flow chart of a read process.

FIG. 10 is a flow chart of the read process. The read process is called when a read I/O command is received from the host, and executed by a storage controller. First, the storage controller receives a read command transmitted from the host via a front-end driver, and interprets the read command to obtain a logical volume number and a logical volume address of a read target (step 4001). Next, the storage controller determines whether a cache hit is present (step 4002). Specifically, the storage controller refers to the cache directory, and searches for entries corresponding to the logical volume number and the logical volume address in the cache directory. When the entries are present (hit), the storage controller refers to the cache address from the entries, proceeds a branch to Yes, reads data from the cache area (step 4006), and returns the data to the host (step 4007). When no entry corresponds to the logical volume number and the logical volume address in the cache directory (miss), the storage controller proceeds the branch to No, and calls a staging process (step 4003). The staging process is a process executed by a data protection controller, and reads data corresponding to the logical volume number or the logical volume address from a permanent area on the storage device. The read data is stored in a cache data area on the memory (step 4004). At this time, the cache data update process, which will be described later, is called by setting necessity of non-volatilization to "unnecessary". The storage controller updates the cache directory (step 4005). At this time, the cache directory is one piece of the control information, and thus the control information update process, which will be described later, is called. At this time, the control information update process is called by setting the necessity of non-volatilization to "unnecessary" in the same manner as the cache data update process. Then, the storage controller reads the data from the cache (step 4006) and returns the data to the host (step 4007), as in the case of the cache hit.

Figure 11:
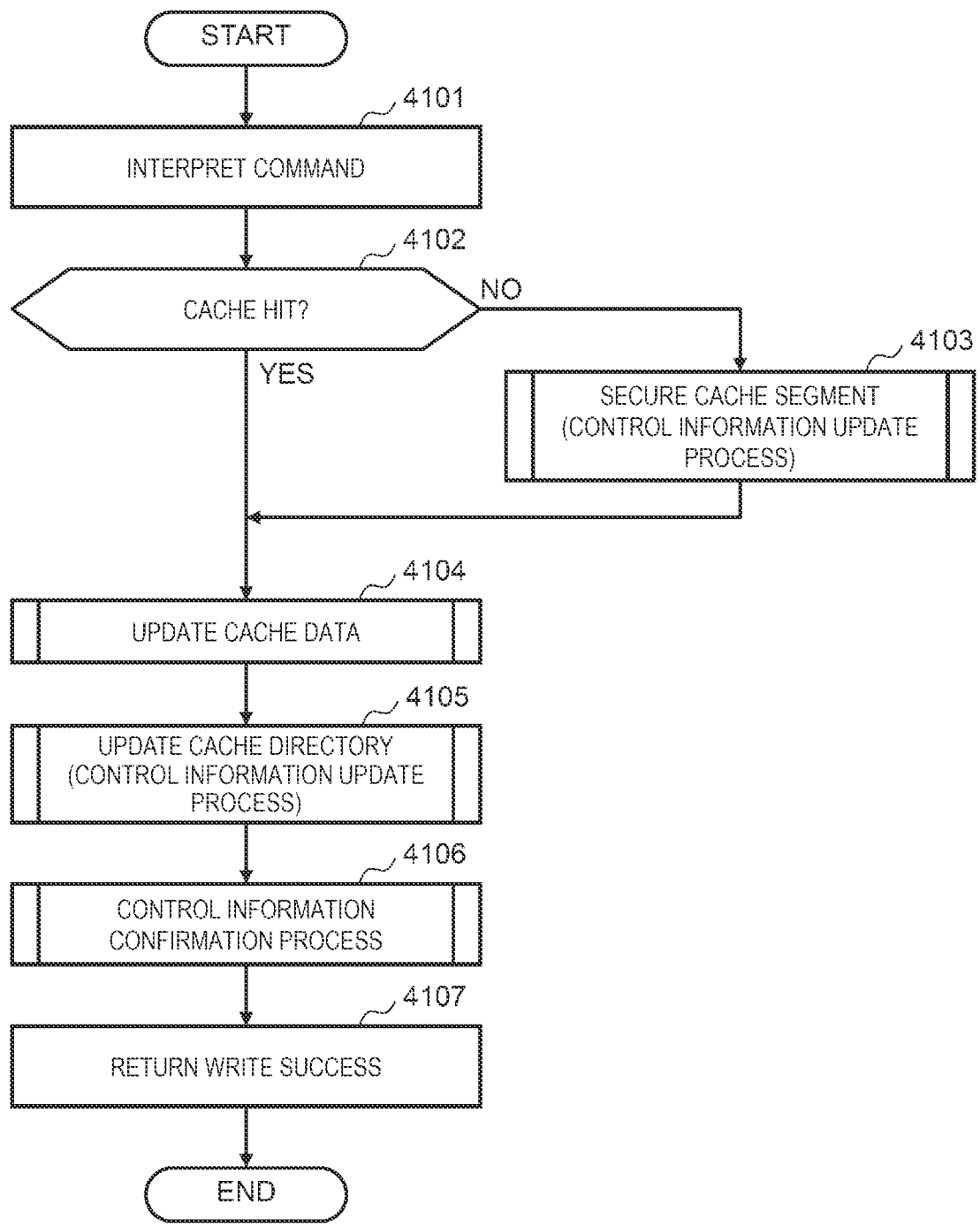
FIG. 11 is a flow chart of a write process.

FIG. 11 is an example of a flow chart illustrating the write process. The write process is executed by the storage controller. First, the storage controller receives a write command transmitted from the host via the front-end driver, and interprets the write command to obtain a logical volume number and a logical volume address of a write target (step 4101). Next, the storage controller determines whether the cache hit is present (step 4102). Specifically, the storage controller refers to the cache directory, and searches for the entries corresponding to the logical volume number and the logical volume address in the cache directory. When the entries are present (hit), the storage controller refers to the cache address from the entries, proceeds a branch to Yes, and stores data in the cache (step 4104). At this time, the cache data update process, which will be described later, is called by setting the necessity of non-volatilization to "unnecessary". Next, the storage controller updates the corresponding cache directory (step 4105). At this time, the cache directory is one piece of the control information, and thus the control information update process, which will be describe later, is called. At this time, the control information update process is called by setting the necessity of non-volatilization to "necessary" in the same manner as the cache data update process. Next, a control information confirmation process, which will be described later, is called (step 4106). Finally, the storage controller returns a write success to the host (step 4107).

In a case of a cache miss, the storage controller proceeds the branch to No, secures the cache segment (4103), and also calls the control information update process to secure the cache segment. At this time, the necessity of non-volatilization is set to "necessary". Hereinafter, the process proceeds to step 4104, and subsequent steps are the same as the case of hit.

Figure 12:
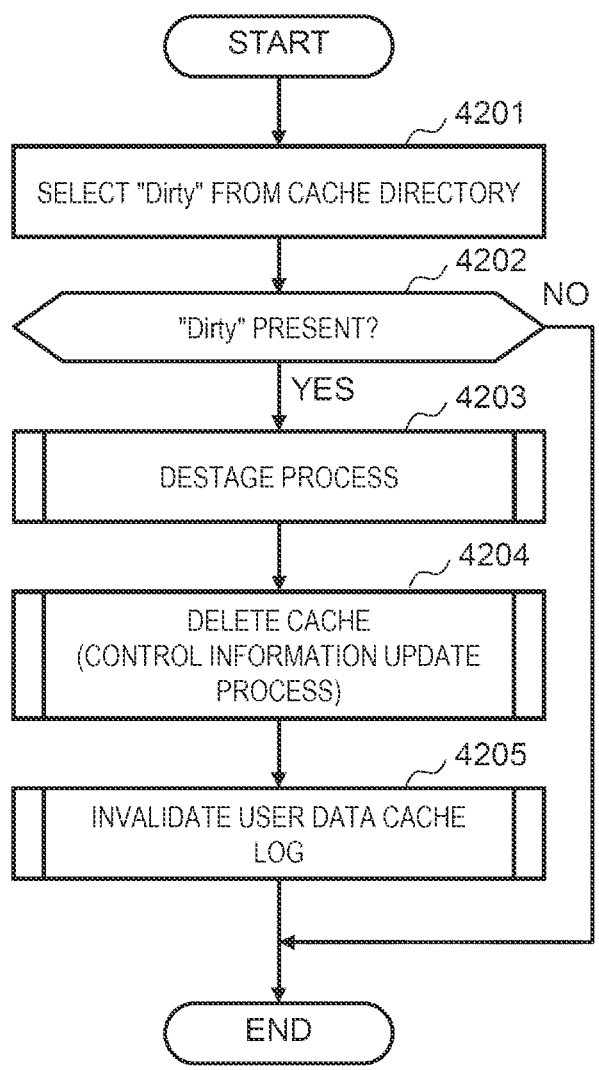
FIG. 12 is a flow chart of an asynchronous destage process.

FIG. 12 is a flow chart of the asynchronous destage process. In the asynchronous destage process, an entry whose attribute is "Dirty" is searched for from the cache directory (step 4201), and the process ends when no such entry is present (branch No). When the entry of "Dirty" is present (branch Yes), the destage process is executed on the cache segment (step 4203).

The destage process is a process executed by the storage controller and a data protection controller, and in the process, data corresponding to the logical volume number or the logical volume address is written into the permanent area on the storage device.

In the destage, various storage functions such as the thin provisioning function, the snapshot function, and the data redundancy function are provided. For example, the thin provisioning function is a function of dynamically allocating the capacity in a fixed size in response to the writing, and generates a logical-physical conversion address that associates a logical space with a physical space. For the snapshot function, data at a certain point in time is virtually stored (the data is referred to as a snapshot image), only an area updated when an update is present is stored in another area, and a logical-physical conversion address from a logical space of the snapshot image to the physical space of another area is generated for reference of the snapshot image. In the data redundancy function, in order to set data redundant by a technique such as mirroring and erasure coding (EC), a replica of data is created and stored in another node, or a redundant code (parity) is created from the data and stored in another node, thereby protecting the data. The thin provisioning function and the snapshot function are provided by the storage controller. The data redundancy function is provided by the data protection controller.

After the destage process, the entry is deleted from the cache directory (step 4204). At this time, since the cache directory is updated, the control information update process is called for update by setting the necessity of non-volatilization as "necessary". Next, a user data cache log is invalidated (step 4205). This process is a process of searching for a cache data log header management table and invalidating a user data cache log in the same address range as that of the data destaged in this process.

Figure 13:
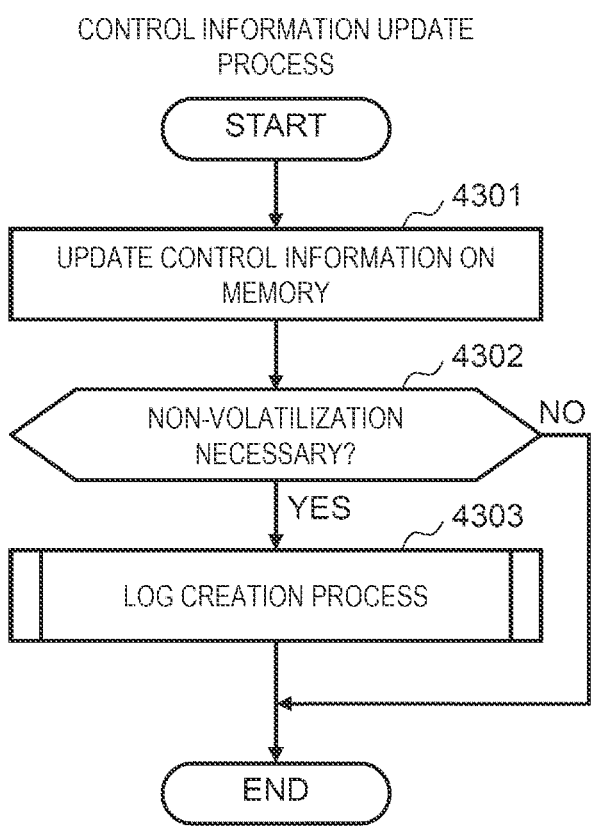
FIG. 13 is a flow chart of a control information update process.

FIG. 13 is a flow chart of the control information update process. The control information update process is called at the time of updating the control information on the memory. When the control information update process is called, a memory address and a size for specifying the control information which is the update target, an update value, and information indicating the necessity of non-volatilization are passed.

First, the control information on the memory is updated (step 4301). Next, the necessity of the non-volatilization is determined with reference to the passed necessity of non-volatilization (step 4302). Only when the non-volatilization is necessary, the log creation process is called (4303).

Figure 14:
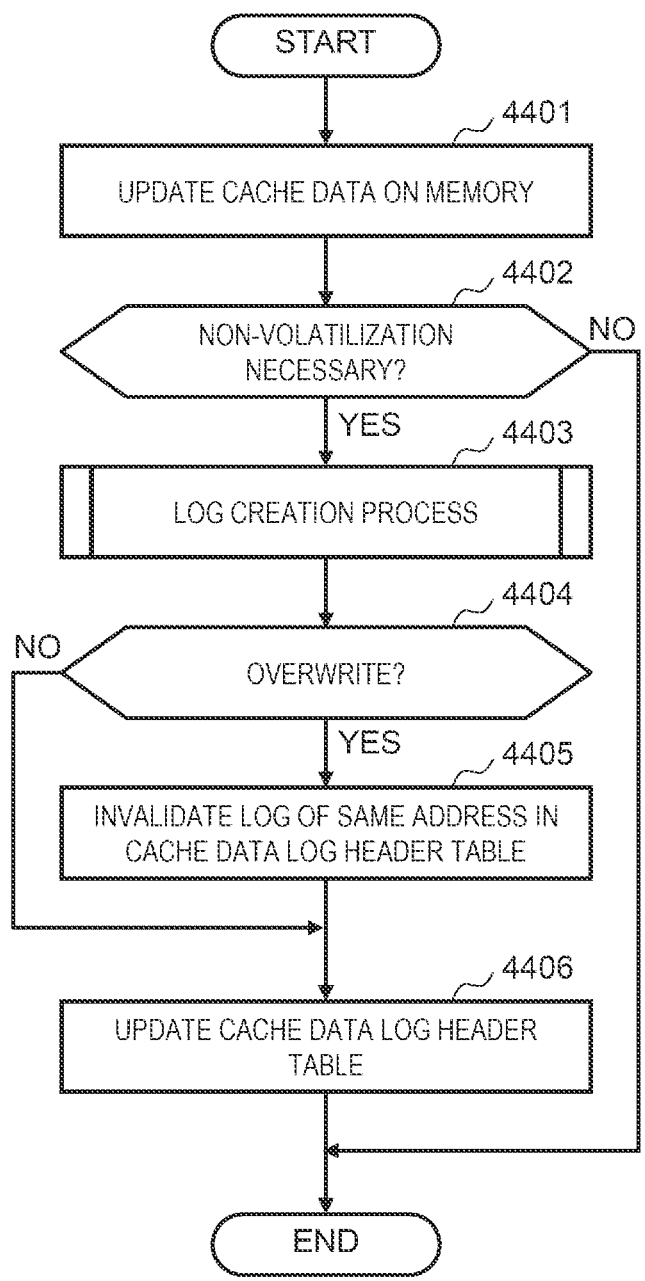
FIG. 14 is a flow chart of a cache data update process.

FIG. 14 is a flow chart of the cache data update process. Steps 4401 to 4403 are the same as steps 4301 to 4303 except that the update target is the cache data instead of the control information. In the cache data update process, unlike the control information update process, when it is determined in step 4402 that the non-volatilization is necessary, a process of steps 4404 to 4406 is added. First, whether to overwrite the cache data is determined (step 4404). That is, the cache data log header management table is referred to, and whether a log of the same address is present is searched for. When the log of the same address is present, it is determined to overwrite the cache data. Only when the cache data is overwritten, the log of the same address in the cache data log header management table is invalidated (the validity flag is set to "INVALID"). Finally, a log header of the log created in step 4403 is added to the cache data log header management table (step 4406).

Figure 15:
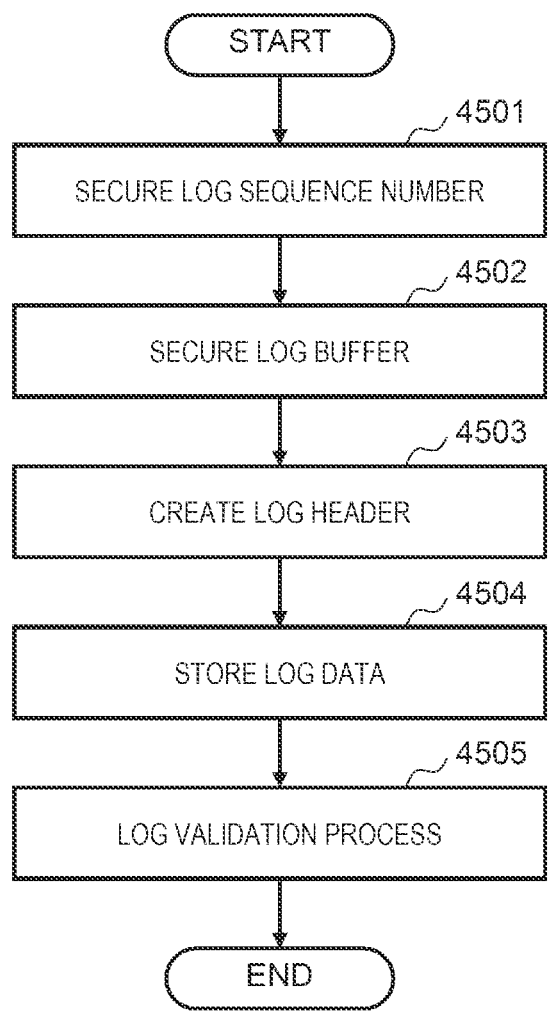
FIG. 15 is a flow chart of a log creation process.

FIG. 15 is a flow chart of the log creation process. It should be noted that, in the process, the "log buffer" indicates the control information log buffer when the update target is the control information, and indicates a user data cache log buffer when the update target is user data cache.

First, a log sequence number is determined (step 4501). The log sequence number is a number that is assigned in an order of log creation and in which one log always corresponds to one log sequence number. Next, an area to which the log is next written is secured in the log buffer (step 4502).

The log creation process may be executed by a plurality of processes operating in parallel, but in this case, it is necessary to execute an exclusion process such that the same log sequence number is not acquired by another process and the same log buffer area is not secured by another process.

Next, the log header is created (step 4503). The log sequence number is stored in the log sequence number field of the log header, and values of the address and the update size of the update target on the memory, which are passed in the log creation process, are stored in the update address field and the update size field. The area type field stores "control information" when the control information is updated, and stores "cache data" when the cache data is updated.

Next, the log is stored in the log buffer (step 4504). The log includes the log header and update target data per se. The log header is stored at a head of a secure area previously secured on the log buffer, and the updated data per se is stored at a memory address obtained by adding a log header size to the secure area.

Finally, the validity flag in the log header is set to "VALID" (step 4505), and the process ends.

Figure 16:
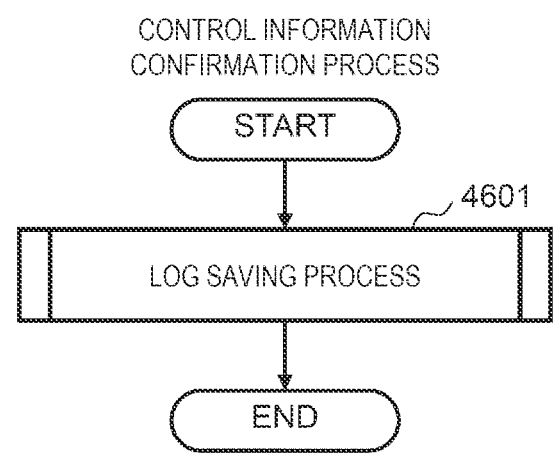
FIG. 16 is a flow chart of a control information confirmation process.

FIG. 16 illustrates the control information confirmation process. This process only calls the log saving process (step 4601).

Figure 17:
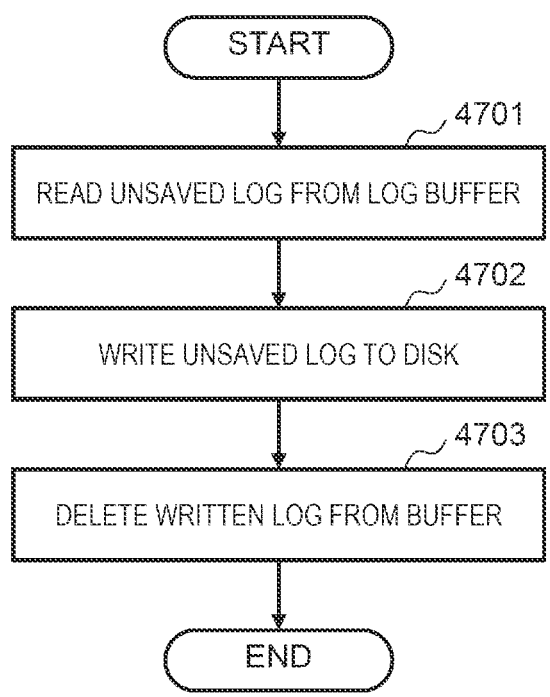
FIG. 17 is a flow chart of a log saving process.

FIG. 17 illustrates a process flow of the log saving process. First, the log buffer is referred to and an unsaved log is read out (step 4701). Next, the unsaved log is stored in the log area on the storage device (step 4702). A writing position is immediately after the last written log.

When the writing is completed, a log buffer on the memory is deleted from the log (step 4703).

Figure 18:
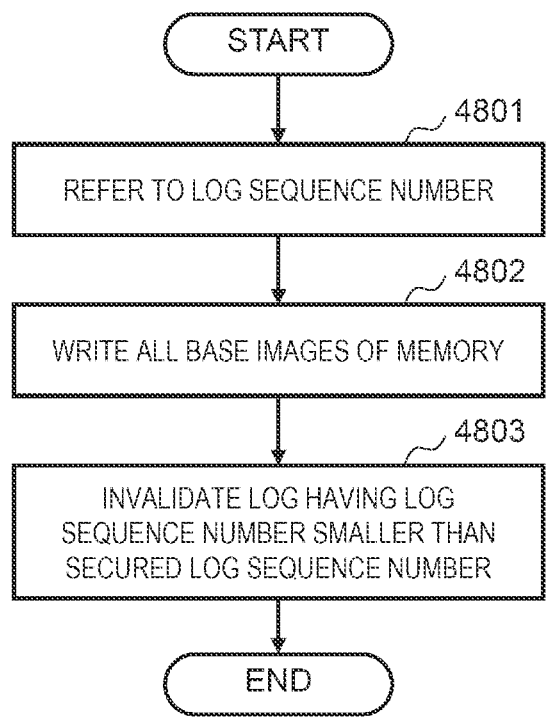
FIG. 18 is a flow chart of a base image saving process.

FIG. 18 illustrates a process sequence of the base image saving process. The process is asynchronously executed. The process may be called by detecting that free of a control information log area is reduced. First, the log sequence number is referred to (step 4801). The process is the same as securing the log sequence number in the log creation process. Next, the entire control information is written to the base image area on the storage device (step 4802). When the writing is completed, old logs are invalidated (step 4803). The old logs are logs each having a log sequence number smaller than the log sequence number referred to in step 4801. Specifically, the "validity flag" of each of these logs on the storage device may be set to "INVALID", or the log sequence number referred to in step 4801 may be stored as a "base image saving log sequence number" on the storage device.

Figure 19:
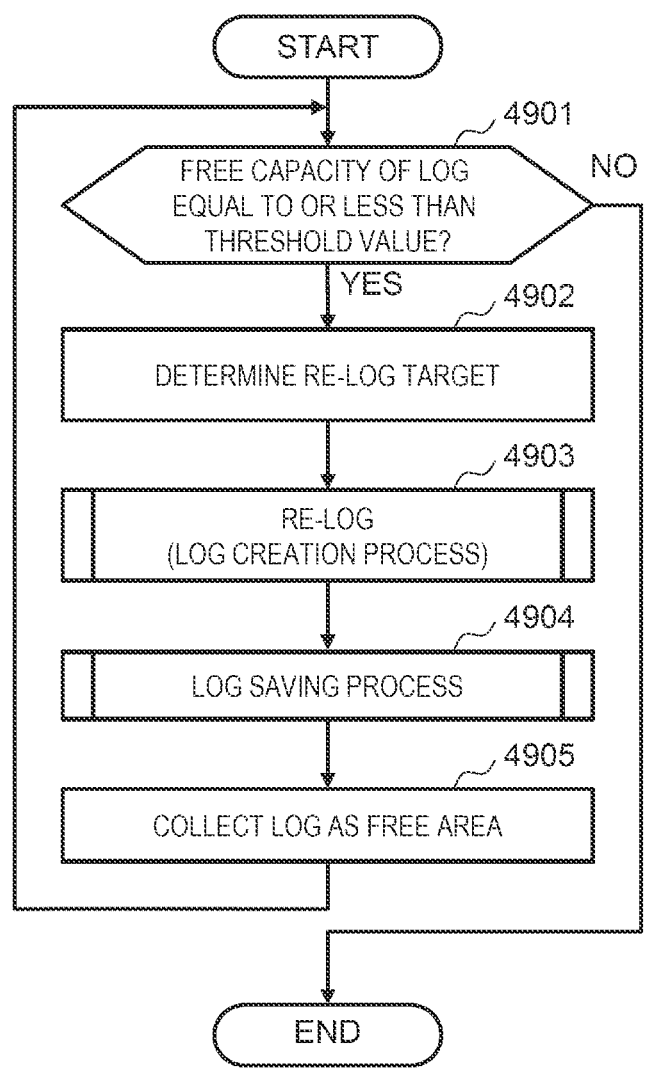
FIG. 19 is a flow chart of a cache data log garbage collection process.

FIG. 19 is a cache data log garbage collection process. First, it is determined whether a free capacity of the cache data log is equal to or less than a threshold value (step 4901). When the free capacity is larger than the threshold value, nothing is done and the process ends. When the free capacity is equal to or less than the threshold value, a cache log header management table on the memory is referred to, searching is executed forward from the oldest cache log header (the smallest log sequence number) among cache log headers, and the oldest validity flag whose validity flag value is "VALID" is obtained (step 4902). When the oldest valid log is specified in the cache data log area, a log of data indicating the log is newly created (step 4903). At this time, a new log sequence number may be secured and reassigned. Next, when the log saving process is called and the log in the storage device is written (4904), an area having an address lower than that of the log including the log in the log area is collected as a log free area (step 4905).

Figure 20:
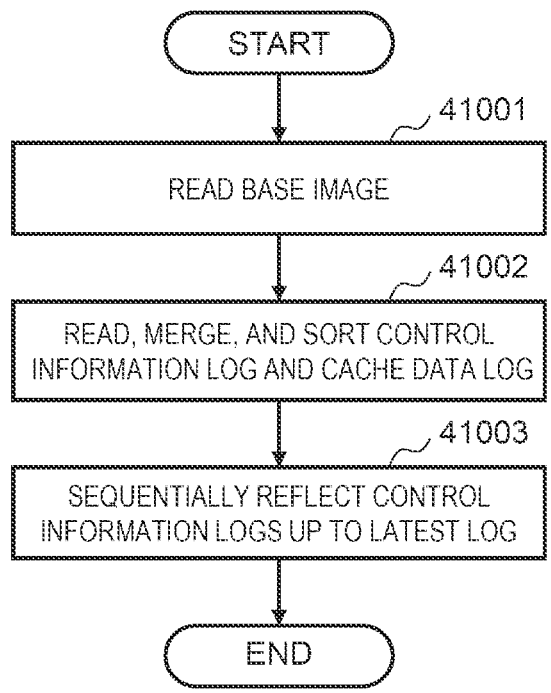
FIG. 20 is a flow chart of a log recovery process.

FIG. 20 is a flow chart of a log recovery process. This process is called before the storage controller is activated at the time of reactivation after power interruption. First, a base image is read out from the base image area on the storage device (step 41001). Next, the control information log and the cache data log are sorted according to the log sequence number, and the oldest log (a log having the smallest log sequence number) to the latest log (a log having the biggest log sequence number) are arranged (step 41002). Hereinafter, the oldest log to the latest log are reflected in the respective areas of the control information and the cache data on the memory in that order based on the address of the log (step 41003). In this way, the recovery of the control information or the cache data after the power interruption is completed.

In the present embodiment, the base image saving method is applied to the control information and a cache data garbage collection method is applied to the cache data area, and two methods are separately used.

In the base image saving method, it is not necessary to manage the validity or invalidity in each unit of logs, but the entire target area is saved regardless of the presence or absence of an update, and therefore, a copy amount at the time of saving once is large. Accordingly, the base image saving method is suitable for information in which time until a free capacity of the log area is filled is relatively long, that is, a size of the update log is small.

On the other hand, in the garbage collection method, only old valid logs are selected and copied, and thus the copy amount is small. In contrast, it is necessary to manage the validity or the invalidity in the units of logs, and thus the garbage collection method is suitable for information having a small number of logs, that is, relatively low update frequency.

From this viewpoint, since the control information has a feature that an update granularity is small and the update frequency is large, the base image saving method is suitable. On the other hand, the cache data area has a small update frequency (in many cases, the cache data is updated once for one I/O), but has a large update size at one time. Therefore, the garbage collection method is suitable for the cache data. By separately using the two methods, it is possible to reduce the copy amount for free collection while reducing a log management information size, and the control can be achieved with low overhead.

In the present embodiment, when the cache data or the cache directory is updated, the log creation process is called by setting the necessity of non-volatilization to "unnecessary" in the read process and setting the necessity of non-volatilization to "necessary" in the write process. Data to be stored in the cache data in the read process can be staged again even when the data is lost due to power interruption because the same data is present on the storage device, and no problem is present. In the read process, no overhead occurs in log creation and saving, and thus performance is improved.

Second Embodiment

Next, a second embodiment will be described.

Figure 21:
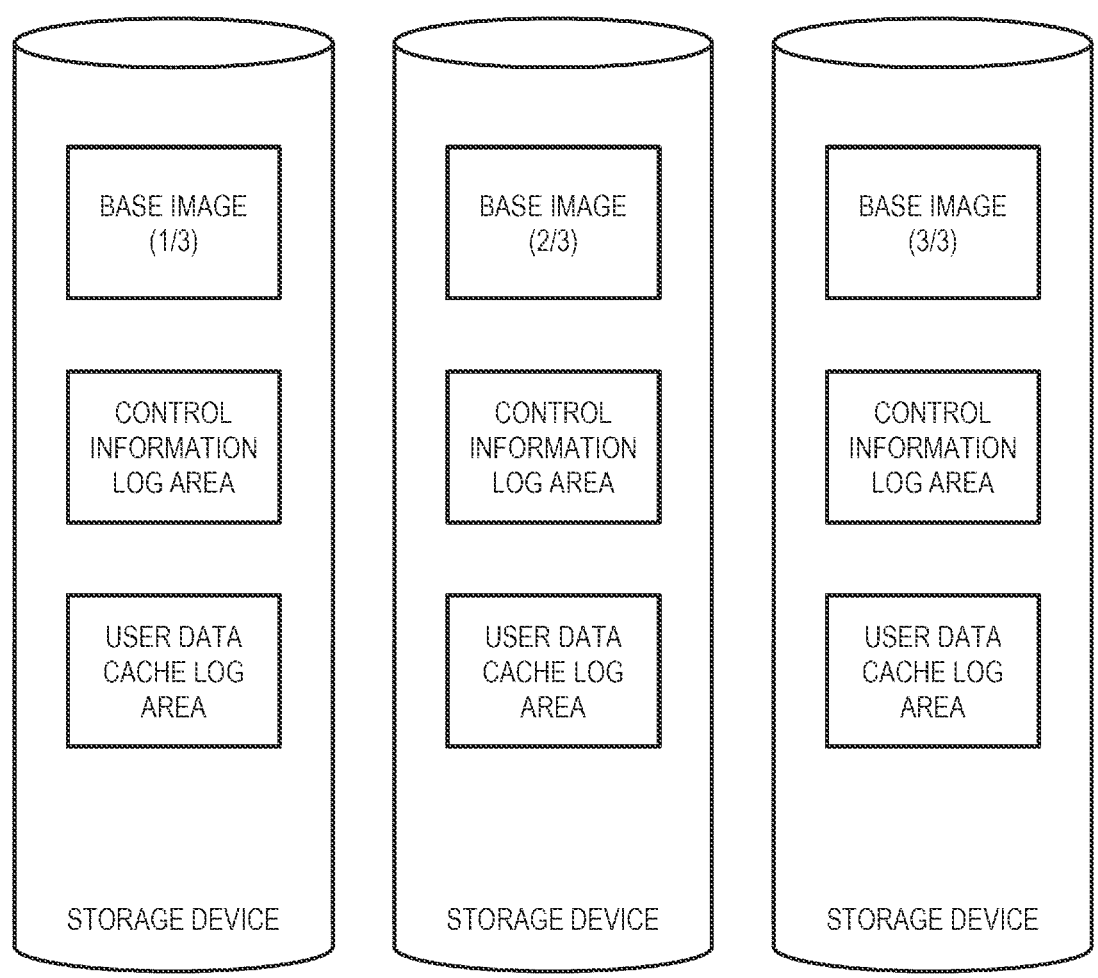
FIG. 21 is an explanatory diagram of a second embodiment.

FIG. 21 is a configuration diagram of a storage device, a base image area, and a log area according to the second embodiment.

The present embodiment is an embodiment in which a plurality of control information log areas and a plurality of cache data log areas are provided on a plurality of storage devices. For example, the control information log areas may be provided in a plurality of storage devices, and the cache data log areas may be provided in the remaining storage devices. Alternatively, the control information log area and the cache data log area may be both provided in the storage devices.

Figure 22:
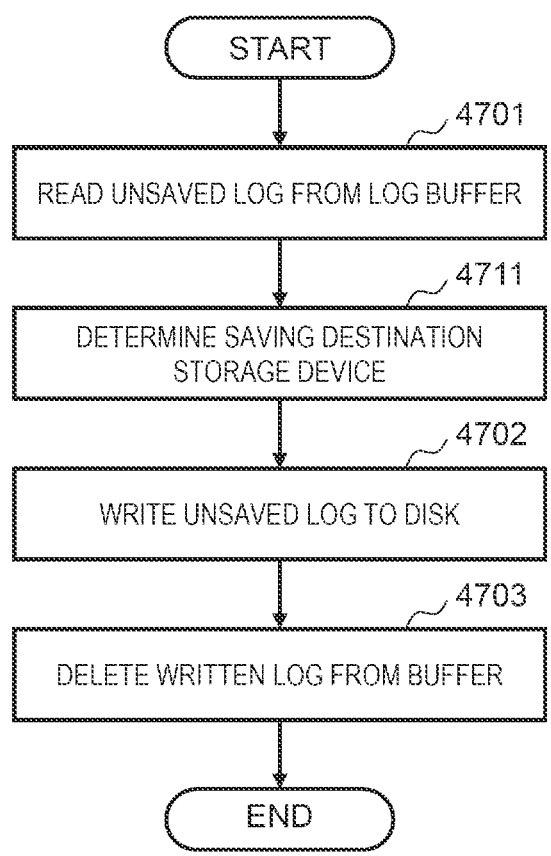
FIG. 22 is a flow chart of a log saving process according to the second embodiment.

FIG. 22 illustrates a log saving process according to the present embodiment. FIG. 22 is different from FIG. 17 that step 4711 is added after step 4701.

In step 4711, a saving destination storage device is determined. A storage device to save a log is selected from a plurality of storage devices. The selection may be executed in a round-robin manner, or a storage device having the smallest load may be selected by monitoring a load of each storage device. By writing logs to a plurality of storage devices in parallel, a writing performance of the storage devices can be effectively utilized to speed up the writing. A control information log and a control information log may be written to separate storage devices. Furthermore, a plurality of storage devices may be used to write the control information log, and a plurality of storage devices may be used to write the cache data log.

Figure 23:
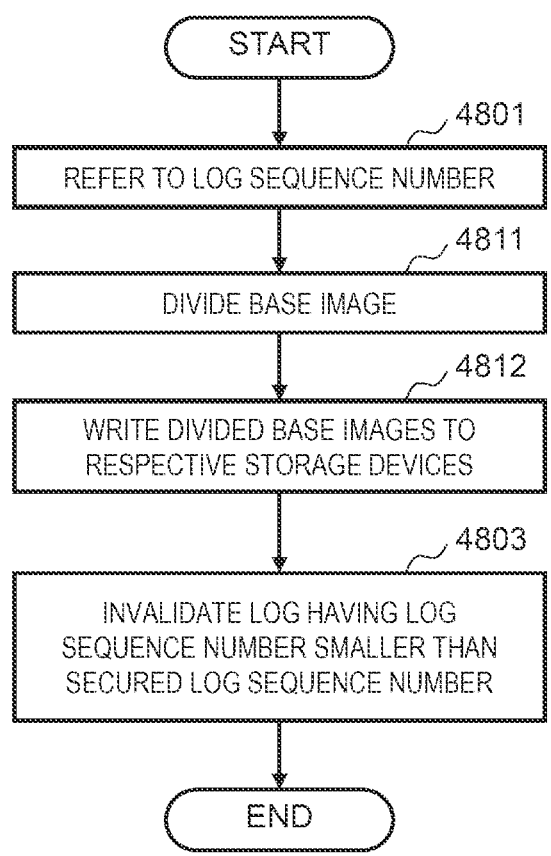
FIG. 23 is a flow chart of a base image saving process according to the second embodiment.

FIG. 23 is a base image saving process according to the present embodiment. FIG. 23 is different from FIG. 18 that steps 4811 and 4812 are added after step 4801. That is, a base image is divided into base image areas on a plurality of storage devices and stored in the plurality of storage devices. The base image may be simply divided by a size (divided into a fixed length or an equal size), or each size to be divided may be changed according to a load or a free capacity.

Figure 24:
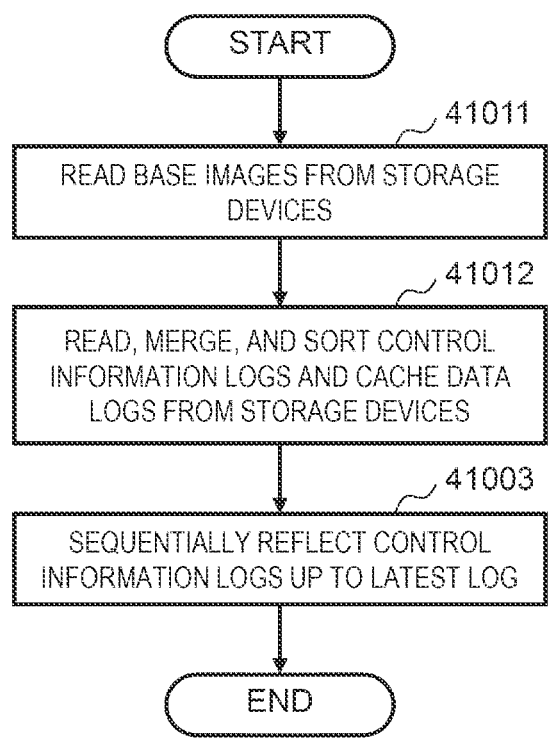
FIG. 24 is a flow chart of a log recovery process according to the second embodiment.

FIG. 24 illustrates a log recovery process according to the present embodiment. FIG. 24 is different from FIG. 20 in that step 41001 is changed to step 41011 and step 41002 is changed to step 41012, so that a plurality of storage devices are to be read.

In step 41011, base images read from a plurality of devices are combined and processed as one base image. In step 41012, logs read from the plurality of storage devices are merged and sorted in the same manner as the control information log and the cache data log.

Third Embodiment

Figure 25:
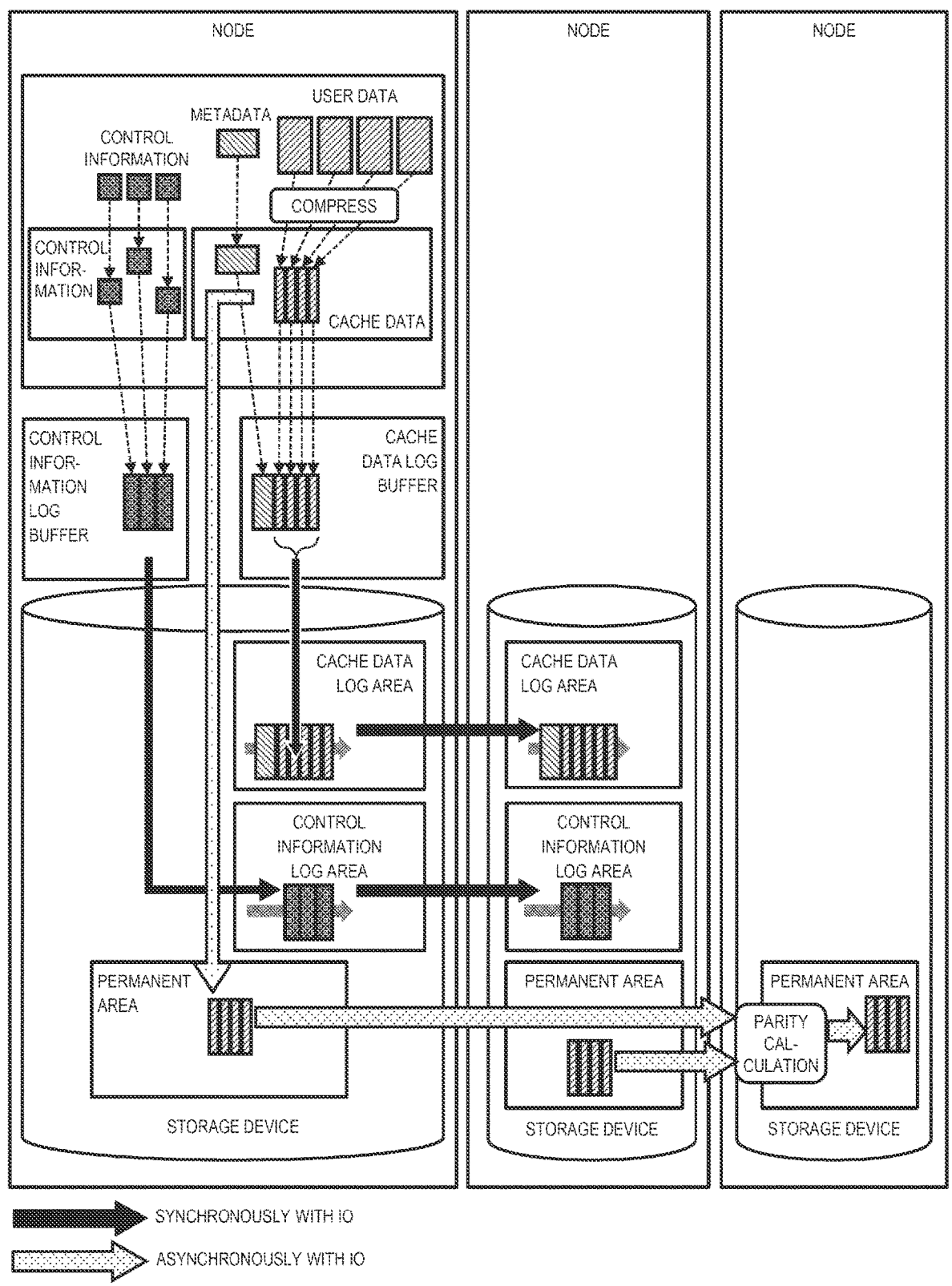
FIG. 25 is an explanatory diagram of a third embodiment.

FIG. 25 illustrates a third embodiment of the invention.

The third embodiment is an example in which a compression function is supported.

The compression function is an example of various functions supported by a storage controller. The compression function is a function in which data received from a host is compressed by a data compression algorithm such as LZ4 for storing, so that consumption of a capacity can be prevented, a capacity of a disk can be saved, and a cost of the disk can be prevented. Although time of a compression process increases, a data process is executed in a reduced size after the compression, and thus process time can be expected to be reduced as a whole.

As illustrated in FIG. 25, the data received from the host is stored in a cache data area. A process at this time is the write process illustrated in FIG. 11, but is different from the write process in that data to be written to a memory is compressed and the compressed data and metadata indicating a position thereof is written.

At this time, the compressed data and the metadata is written in the cache data area in an additional writing format. The reason is that, in the compression function, a size of the data received from the host after the compression is indefinite (depends on a compression effect), and therefore, even when the compressed data is to be overwritten on old data, a size of the compressed data may not be changed to be larger than that of the old data.

Therefore, the additional writing method is suitable in which a new area is always secured and written, and an area of old data is released as a free area. In addition, since the additional writing format is used, information (metadata) indicating a storage position of the compressed data is necessary. The metadata is also stored in the cache data area.

The compressed data and the metadata stored in the cache data area are stored in a cache data log area on the disk in synchronization with a host 10 (that is, before a response is returned to the host).

When cache data and control information is stored in a log area, an operation of collectively writing a plurality of logs stored in a log buffer in a single disk write process ("collective writing") is adopted, and thus a process efficiency can be improved, the number of disk writes can be reduced, and performance can be improved. The control information has a smaller size than that of data, and thus may not be compressed.

When a larger number of logs are to be collected in this collective writing, it is conceivable to save the logs after waiting for a larger number of logs to be accumulated in the log buffer, but in this case, a response of the control information confirmation process executed before a response of the I/O is delayed, and a response to a host I/O is delayed. In order to prevent this, the log saving process is not delayed by collecting all logs accumulated in the log buffer at the time when the log saving process is called. According to this method, when an I/O load on the storage is high and a large number of logs are accumulated in the log buffer at the same time, a collective writing efficiency is naturally increased, but when the load is low, the response to the host I/O is not delayed more than necessary, and it is possible to achieve both high throughput performance required when the load is high and response reduction required when the load is low.

Compressed data and metadata on the cache data area are written to a permanent area on the disk asynchronously with the host I/O. This process is the asynchronous destage process illustrated in FIG. 12. At this time, the compressed data and the metadata are written in the additional writing format also in the destage process as in the case of writing to the cache data area. In the asynchronous destage process, a process efficiency can be improved, the number of disk writes can be reduced, and the performance can be improved by executing collective writing in which proximity data is collectively written in a single disk write process. In particular, it is easy to execute the collective writing for the compressed data that adopts the additional writing format. This point is the same as the storage in the cache data log area. The destage has more processes than those of the log saving process.

As illustrated in the description in FIG. 12, in the destage process executed by the data protection controller in the process, data can be set redundant by mirroring or erasure coding (EC).

FIG. 25 illustrates an example of the EC, and parity data calculated with other data is set redundant by being stored in another node. In the third embodiment, it is illustrated that by collectively writing the control information and the cache data log in the log area, the process efficiency can be improved, and at the same time, the number of disk writes can be reduced, and that even in the destage, in particular, in the compression function, a collective writing effect can be enhanced, the process efficiency can be enhanced, the number of disk writes can be reduced, and the performance can be improved. In addition, since a flow rate of data flowing through the disk is reduced by the compression function as compared with the case of non-compression, the data flow rate to the disk is reduced, so that the disk can be efficiently used and the performance is improved.

As described above, the disclosed storage system 100 includes the storage controller 1083 as a storage controller that controls reading and writing from and to the drive 1033 as a storage having a non-volatile storage device. In the reading and writing, the storage controller generates a log and stores the log in the memory 1032 which is a log memory, and writes the log stored in the memory to the storage device. The log includes a control information log and a cache data log, and when the log is generated, the storage controller stores the generated control information log in the log memory, collectively writes the generated control information log to the storage device in units of storage areas having a plurality of control information logs, stores the generated cache data log in the log memory, compresses the cache data in the log memory, and writes the compressed cache data to the storage device.

In addition, the storage controller executes, when collecting a free area of the memory, a base image saving method of writing in the storage device in units of storage areas having a plurality of logs and collecting a free area, and a garbage collection method of writing in the storage device in units of logs and collecting a free area.

With such a configuration and operations, it is possible to achieve a storage system having both high performance and high reliability.

As an example, the storage controller is configured to store, when updating the log stored in the memory, an after-update log in a storage area different from a storage area in which a before-update log is stored, and invalidate the before-update log. In the base image saving method, a plurality of logs that are not invalidated in the storage area are stored in the storage device, and the storage area is collected as the free area. In the garbage collection method, a process of collecting a storage area of the invalidated log as the free area and a process of storing the logs that are not invalidated in the storage device and invalidating a log of a storage area in which the log is stored are asynchronously executed.

In addition, the log includes a control information log related to storage control and a user data log related to the reading and writing. The control information log has a smaller update granularity than that of the user data log, the base image saving method is applied to the control information log, and the garbage collection method is applied to the user data log.

Therefore, it is possible to efficiently store the control information, the cache data, and the like in the storage system 100 to the storage device, and to achieve high performance and high reliability.

The storage controller is configured to manage the control information log and the user data log by adding order control information indicating a process order to the control information log and the user data log, thereby securing consistency in the order between the control information log and the user data log.

Therefore, it is possible to easily secure the consistency even though management methods are different between the control information log and the user data log.

In a log recovery process for recovering data from the control information log and the user data log, the storage controller recovers the control information by using the base image saving method, and recovers the user data after securing an area in advance.

Therefore, it is possible to efficiently recover data.

The storage controller uses the base image saving method for data whose update size is less than a predetermined value, and uses the garbage collection method for data whose update size is equal to or greater than the predetermined value.

By adopting such an operation, it is possible to efficiently manage the free area in accordance with the update size of the data.

The disclosed storage system 100 includes a plurality of storage controllers and has a configuration in which each storage controller is set to redundant.

That is, in the storage system in which the storage controller is set to redundant, it is possible to efficiently store the control information, the cache data, and the like to the storage device and achieve the high performance and the high reliability.

The invention is not limited to the above-described embodiments, and includes various modifications. For example, the embodiments described above have been described in detail for easy understanding of the invention, and the invention is not necessarily limited to those including all of the configurations described above. In addition, the configuration is not limited to being deleted, and the configuration may be replaced or added.

For example, in the embodiments described above, a configuration in which the log sequence number is used as the order control information is illustrated, while a time stamp may be assigned to the log, and the time stamp may be used as the order control information. In addition, a pointer to the next log may be assigned and may be used as the order control information. The order control information is not limited to the configuration to be assigned to each log, and may be assigned to logs in a certain range.

What is claimed is:

1. A storage system comprising:
a non-volatile storage device;
a storage controller configured to process data to be read and written from and to the storage device using a storage function; and
a volatile memory,
wherein the storage controller is configured to, when receiving a data write request,
store data related to the received write request in the memory,
store a log related to the data stored in the memory in the storage device,
execute a completion response to a source of the data write request after the log is stored in the storage device, and
process the data stored in the memory using the storage function and destage the data in the storage device, and
wherein a plurality of the logs are stored in parallel in a plurality of the storage devices.

2. The storage system according to claim 1, wherein the storage of the log related to the data in the storage device is a process having a lighter load than that of the destage of the data.

3. The storage system according to claim 2, wherein the log stored in the storage device is a log for restoring the data in the memory, and
the destage of the data in the storage device is for exerting the storage function and writing or updating the data stored in the storage system.

4. The storage system according to claim 1, wherein when the data is destaged, a log in the storage device related to the destaged data is invalidated.

5. A storage system, comprising:
a non-volatile storage device;
a storage controller configured to process data to be read and written from and to the storage device using a storage function; and
a volatile memory,
wherein the storage controller is configured to, when receiving a data write request,
store data related to the received write request in the memory,
store a log related to the data stored in the memory in the storage device,
execute a completion response to a source of the data write request after the log is stored in the storage device, and
process the data stored in the memory using the storage function and destage the data in the storage device,
wherein when the data is destaged, a log in the storage device related to the destaged data is invalidated, and
wherein when data obtained by updating data related to the log is written, a log in the storage device related to data before the update is invalidated.

6. The storage system according to claim 5, wherein the storage controller is configured to manage a control information log and a user data log by assigning order control information indicating a process order to the control information log and the user data log, so that consistency in an order of the control information log and the user data log is secured.

7. The storage system according to claim 5, wherein the data related to the received write request is compressed and stored in the memory,
the compressed log related to the compressed data is stored in the storage device, and
the compressed data is subjected to the destage.

8. A storage system, comprising:
a non-volatile storage device;
a storage controller configured to process data to be read and written from and to the storage device using a storage function; and
a volatile memory,
wherein the storage controller is configured to, when receiving a data write request,
store data related to the received write request in the memory,
store a log related to the data stored in the memory in the storage device,
execute a completion response to a source of the data write request after the log is stored in the storage device, and
process the data stored in the memory using the storage function and destage the data in the storage device,
wherein the log includes a control information log and a cache data log, and
wherein the control information log and the cache data log are separately and collectively stored in the storage device for each of a plurality of control information logs and each of a plurality of cache data logs.

9. The storage system according to claim 8, wherein the cache data log has a size larger than that of the control information log,
the cache data log is compressed and stored in the storage device, and
the control information log is not compressed and is stored in the storage device.

10. The storage system according to claim 8, wherein the storage controller is configured to execute, when collecting a capacity related to a storage area of the memory storing the log written to the storage device, a base image saving method of writing the control information log in the storage device in units of storage areas having a plurality of logs and collecting a free area, and a garbage collection method of writing the cache data log in the storage device in units of logs and collecting a free area.

11. The storage system according to claim 10, wherein the storage controller is configured to store, when updating the log, an after-update log in a storage area different from a storage area in which a before-update log is stored, and invalidate the before-update log, in the base image saving method, store, in the storage device, a plurality of logs that are not invalidated in the storage area, and collect the storage area as a free area, and in the garbage collection method, asynchronously execute a process of collecting a storage area of the invalidated log as a free area and a process of storing a log that is not invalidated in the storage device and invalidating a log of a storage area in which the log is stored.

12. A storage control method in a storage system including a non-volatile storage device and a volatile memory, comprising:

processing data to be read and written from and to the storage device using a storage function, wherein when receiving a data write request, storing data related to the received write request in the memory, storing a log related to the data stored in the memory in the storage device, executing a completion response to a source of the data write request after the log is stored in the storage device, and processing the data stored in the memory using the storage function and destaging the data in the storage device; and storing a plurality of the logs in parallel in a plurality of the storage devices.

13. The storage control method according to claim 12, wherein the storing of the log related to the data in the storage device is a process having a lighter load than that of the destaging of the data.

14. The storage control method according to claim 13, wherein the log stored in the storage device is a log for restoring the data in the memory, and the destaging of the data in the storage device is for exerting the storage function and writing or updating the data stored in the storage system.

15. The storage control method according to claim 12, wherein when the data is destaged, a log in the storage device related to the destaged data is invalidated.

16. A storage control method in a storage system including a non-volatile storage device and a volatile memory, comprising:

processing data to be read and written from and to the storage device using a storage function, wherein when receiving a data write request, storing data related to the received write request in the memory, storing a log related to the data stored in the memory in the storage device, executing a completion response to a source of the data write request after the log is stored in the storage device, and processing the data stored in the memory using the storage function and destaging the data in the storage device;

wherein when the data is destaged, a log in the storage device related to the destaged data is invalidated, and wherein when data obtained by updating data related to the log is written, a log in the storage device related to data before the update is invalidated.

17. The storage control method according to claim 16, further including managing a control information log and a user data log by assigning order control information indicating a process order to the control information log and the user data log, so that consistency in an order of the control information log and the user data log is secured.

18. The storage control method according to claim 16, wherein the data related to the received write request is compressed and stored in the memory, the compressed log related to the compressed data is stored in the storage device, and the compressed data is subjected to the destaging.

19. A storage control method in a storage system including a non-volatile storage device and a volatile memory, comprising:

processing data to be read and written from and to the storage device using a storage function, wherein when receiving a data write request, storing data related to the received write request in the memory, storing a log related to the data stored in the memory in the storage device, executing a completion response to a source of the data write request after the log is stored in the storage device, and processing the data stored in the memory using the storage function and destaging the data in the storage device, wherein the log includes a control information log and a cache data log, and wherein the control information log and the cache data log are separately and collectively stored in the storage device for each of a plurality of control information logs and each of a plurality of cache data logs.

20. The storage control method according to claim 19, wherein the cache data log has a size larger than that of the control information log, the cache data log is compressed and stored in the storage device, and the control information log is not compressed and is stored in the storage device.

21. The storage control method according to claim 19, further including executing, when collecting a capacity related to a storage area of the memory storing the log written to the storage device, a base image saving method of writing the control information log in the storage device in units of storage areas having a plurality of logs and collecting a free area, and a garbage collection method of writing the cache data log in the storage device in units of logs and collecting a free area.

22. The storage control method according to claim 21, further including storing, when updating the log, an after-update log in a storage area different from a storage area in which a before-update log is stored, and invalidating the before-update log, in the base image saving method, storing, in the storage device, a plurality of logs that are not invalidated in the storage area, and collecting the storage area as a free area, and in the garbage collection method, asynchronously executing a process of collecting a storage area of the invalidated log as a free area and a process of storing a log that is not invalidated in the storage device and invalidating a log of a storage area in which the log is stored.

* * * * *